United States Patent [19]

Bennett

[11] Patent Number: 5,624,571

[45] Date of Patent: Apr. 29, 1997

[54] DRIVE MECHANISM AND ASSOCIATED METHOD FOR TILTING PAN FILTER ASSEMBLY

[75] Inventor: James M. Bennett, Norton, Mass.

[73] Assignee: Baker Hughes Incorporated, Houston, Tex.

[21] Appl. No.: 358,827

[22] Filed: Dec. 19, 1994

[51] Int. Cl.$^6$ .................... B01D 33/327; B01D 24/48
[52] U.S. Cl. .................... 210/741; 210/145; 210/328; 210/400; 210/780
[58] Field of Search .................... 210/143, 145, 210/328, 330, 387, 400, 401, 741, 780, 783, 160, 739; 55/351, 353, 354, 352; 91/508, 111, 525, 532, 520; 92/61

[56] References Cited

U.S. PATENT DOCUMENTS

| | | | |
|---|---|---|---|
| 2,633,989 | 4/1953 | Kelly et al. . | |
| 2,853,193 | 9/1958 | Crumb | 210/328 |
| 3,045,253 | 7/1962 | Price | 91/508 |
| 3,080,063 | 3/1963 | Krynski et al. | 210/330 |
| 3,298,524 | 1/1967 | Gaudfrin . | |
| 3,537,589 | 11/1970 | Fratto et al. | 210/328 |
| 4,110,214 | 8/1978 | Pfeffer | 210/780 |
| 4,157,251 | 6/1979 | Colomer | 55/242 |
| 4,364,827 | 12/1982 | Guttman | 210/225 |
| 4,620,478 | 11/1986 | Corominas | 99/533 |
| 5,060,872 | 10/1991 | Chambers | 210/160 |
| 5,320,286 | 6/1994 | Chambers et al. | 210/160 |

*Primary Examiner*—Joseph W. Drodge
*Attorney, Agent, or Firm*—McAulay Fisher Nissen Goldberg & Kiel, LLP

[57] ABSTRACT

A drive mechanism for a tilting-pan filter assembly comprises an annular carrier for supporting a plurality of filter pans for motion along a circular transport path. The carrier is moved along the circular path by drive componentry including a plurality of individual hydraulic motors having pinions meshing with a ring gear on the carrier at respective equispaced drive points. The hydraulic motors are driven by a single pump which supplies a hydraulic fluid under variable pressure and variable flow rate. The hydraulic motors are connected in parallel to one another and to the pump in a closed loop hydraulic circuit. The pump may be driven by an electric motor which absorbs braking energy.

26 Claims, 2 Drawing Sheets

DRIVE MECHANISM AND ASSOCIATED METHOD FOR TILTING PAN FILTER ASSEMBLY

BACKGROUND OF THE INVENTION

This invention relates to a drive mechanism for a filter assembly. More particularly, this invention relates to a drive mechanism for a tilting pan filter assembly. This invention also relates to an associated method for operating a filter assembly.

Tilting pan filter assemblies are well known in the art. These filter assemblies each have a plurality of radially oriented pans which are rotated about a common vertical axis on a carriage or turntable rack. In some instances, a link chain is coupled around the outer periphery of the rack for meshing with a plurality of independently mounted sprockets outside the filter which are driven by electric motors. More frequently, the carrier rack is rotated about the vertical axis by a single electric motor which is operatively connected to a ring or bull gear on the rack via a transmission assembly.

These conventional single-point electric drives have numerous disadvantages. The requisite shear pins, high-torque long-delivery gear reducers, and sensitive electric control systems are susceptible to corrosion, wear, and unreliability owing to harsh conditions frequently encountered at remote plant sites. Maintenance operations are, therefore, difficult and frequent. Many centering casters are necessary.

Most of these disadvantages also pertain where a single hydraulic motor is used to drive a rotating filter. Because such filters are so large, the gear boxes required are huge.

SUMMARY OF THE INVENTION

A drive mechanism for a filter assembly comprises, in accordance with the present invention, a carrier for supporting a filter element for motion along a predetermined transport path, and drive componentry operatively coupled to the carrier for moving the carrier along the predetermined path. The drive componentry includes a plurality of individual drive devices in the form of hydraulic motors operatively coupled to the carrier at respective drive points spaced from one another along the filter element transport path.

The hydraulic motors are direct-drive, high-torque motors and are readily available and moderately priced. Where the carrier includes a circular or annular rack, as in a large horizontally rotating chemical filter assembly, the drive mechanism further comprises a ring or bull gear rigid with the rack, while the hydraulic motors are provided with respective pinions meshing with the ring gear. The low-speed high-torque motors allow direct drive via the pinions, thereby providing a compact packaging arrangement. The motors and the ring gear may be located alternatively either inside or outside the filter rack or frame.

It is contemplated that each hydraulic motor would provide a high reaction load capacity, thereby assuming large tangential and radial separating forces created by the massive inertia of the rotating filter system. This would minimize auxiliary centering wheels or casters and other supports normally used with a single point drive. The smaller size of the individual hydraulic motors in a multiple-point drive system in accordance with the present invention could be easily guarded and protected from the highly corrosive chemicals which may escape from the filter segments.

According to another feature of the present invention, the drive componentry further includes a single pump operatively connected to the hydraulic motors for supplying, to the hydraulic motors, a hydraulic fluid under variable pressure and variable speed or flow rate. The hydraulic motors are connected in parallel to one another to share load equally. More particularly, the hydraulic motors are connected in a closed loop hydraulic circuit to the pump. This closed loop configuration provides acceleration and deceleration control governed by the rate of pump stroking.

The flow rate of the working fluid (generally, oil) is varied by changing the displacement or stroke of the pump. The pressure varies to a maximum limit which is determined by the setting of a relief valve.

The pump may be driven by an electric motor. The power plant comprising the electric motor and pump provides gradual acceleration and rapid shutdown in the event of mechanical interference of expensive machine elements. Dynamic braking is absorbed by the electric motor.

Hydraulic motors are hydro-mechanical transmissions that convert energy from a fixed-speed electric motor into a steplessly variable, bi-directional rotation energy. The pump produces a moving, mechanically rigid column of oil which is converted by the hydraulic motors back into mechanical rotation and speed. The output torque of the hydraulic motors is a function of pressure applied to the moving column of oil as dictated by the driven load requirement. As load torque increases, the pump is required to produce its flow at increasing pressures, instantaneously and unforgivingly, within the constraints of pressure overload and relief settings.

Torque monitoring of the actual drive load can be implemented by sensing system pressure. In the event of failure of one hydraulic motor, the other motors will provide adequate propulsion at reduced loads.

The sensing of system pressure and the concomitant monitoring of torque or load enables a measurement of system wear. Concurrently detected torque or load is compared with a reference or standard, namely, the torque or load measured when the machine is new. In other words, the torque signature is continuously compared with the original signature to monitor system wear. Such a real-time, continuous wear measurement cannot be undertaken in conventional drive mechanisms for large horizontally rotating chemical filter assemblies.

According to a further feature of the present invention, the hydraulic motors are provided with hydraulic cylinders or other force generating members for applying to the pinions a force which increases as torque increases to thereby hold the pinions in engagement with the ring gear as gear separation forces increase. More particularly, the hydraulic cylinders may be used to pivot and hold the hydraulic motor pinion gears in engagement with the ring or bull gear. The hydraulic cylinders may be energized by tapping off of the motor pressure. Thus, the forces applied to the pinions by the hydraulic cylinders will increase proportionately to torque increases, in direct opposition to gear separation forces.

According to an additional feature of the present invention, the drive points at which the hydraulic motors are operatively coupled to the filter rack are equispaced along the predetermined transport path of the filter.

In a tilting pan filter assembly, a drive mechanism comprises, in accordance with the present invention, a carrier including a substantially annular rack for supporting a plurality of filter elements for motion along a predetermined circular path, and drive componentry operatively coupled to the carrier for moving the rack with the filter elements along the predetermined filter element transport path, the drive componentry including a plurality of individual hydraulic motors operatively coupled to the rack at respective drive points spaced from one another along the filter element transport path. Rotator devices are disposed along the filter path for tilting the filter elements at a dumping or unloading station.

A method for operating a filter assembly comprises, in accordance with the present invention, the steps of (a) energizing an electric motor, (b) driving a pump by the electric motor upon energization thereof, (c) pressurizing a working fluid via the pump upon a driving thereof by the electric motor, (d) operating a plurality of hydraulic motors by feeding the pressurized working fluid thereto, the hydraulic motors being in operative engagement with a filter element carrier, and (e) moving the carrier along a predetermined path by virtue of operation of the hydraulic motors.

In accordance with another feature of the present invention, the step of moving the carrier is implemented by rotating pinions of the hydraulic motors, the pinions meshing with a ring gear on the carrier.

In accordance with a further feature of the present invention, the method further comprises the step of applying to the pinions a force which increases as torque increases to hold the pinions in engagement with the ring gear.

Where the hydraulic motors are operatively connected in parallel to one another and in series to the pump, the step of operating the hydraulic motors includes the step of distributing load substantially equally among the hydraulic motors.

Where the filter assembly is a tilting pan filter assembly and a plurality of filter pans are disposed on the carrier, the method further comprises the step of automatically tilting the pans in sequence at a predetermined unloading station along the filter element transport path.

In a filter assembly drive mechanism in accordance with the present invention, pressure of the working fluid will increase to compensate for increased load. Upon the attainment of a predetermined terminal pressure, a relief valve opens and the hydraulic motors will stall or slip and hold without damage and overheating. Thus, neither a shear pin nor viscous couplings are required to protect against overload.

A filter assembly drive mechanism in accordance with the present invention presents considerable advantages over conventional drive mechanisms employing single electric motors. No shear pin, high-torque long-delivery gear reducer, or sensitive electric control systems are required. Such elements are particularly susceptible to corrosion, wear, and unreliability owing to harsh conditions frequently encountered at remote plant sites. Moreover, a much wider speed range is available, in comparison to conventional drives (at least 20-1, compared with 10-1 for conventional drives).

In a filter assembly drive mechanism in accordance with the present invention, starting and stopping of the rotating filter assembly are soft, owing to the continuous or stepless adjustability in the rate or pressure at which the working fluid (e.g., oil) is supplied to the hydraulic motors. Immediate stopping of the rotating filter assembly is possible because of hydraulic braking. The direction of oil flow through the hydraulic circuit is reversible virtually instantaneously.

A direct sprocket drive at each of the hydraulic motors in a drive system in accordance with the present invention eliminates couplings, a large jack shaft, and a reducer. The power supply requires only simple piping with short hydraulic flex lines to the motors. Accordingly, maintenance is facilitated. The pump of the power supply is easily repaired. Parts are few and easy to replace.

The requirement for centering casters is less stringent in a drive mechanism in accordance with the present invention than in conventional drives with single electric motors; only a minimal number of casters is required. The ring gear is smaller than in conventional electric, single motor drives; replacement cost is reduced. Loading and wear are more uniform. Operation, especially at lower speeds, is smoother.

DETAILED DESCRIPTION

Figure 1:
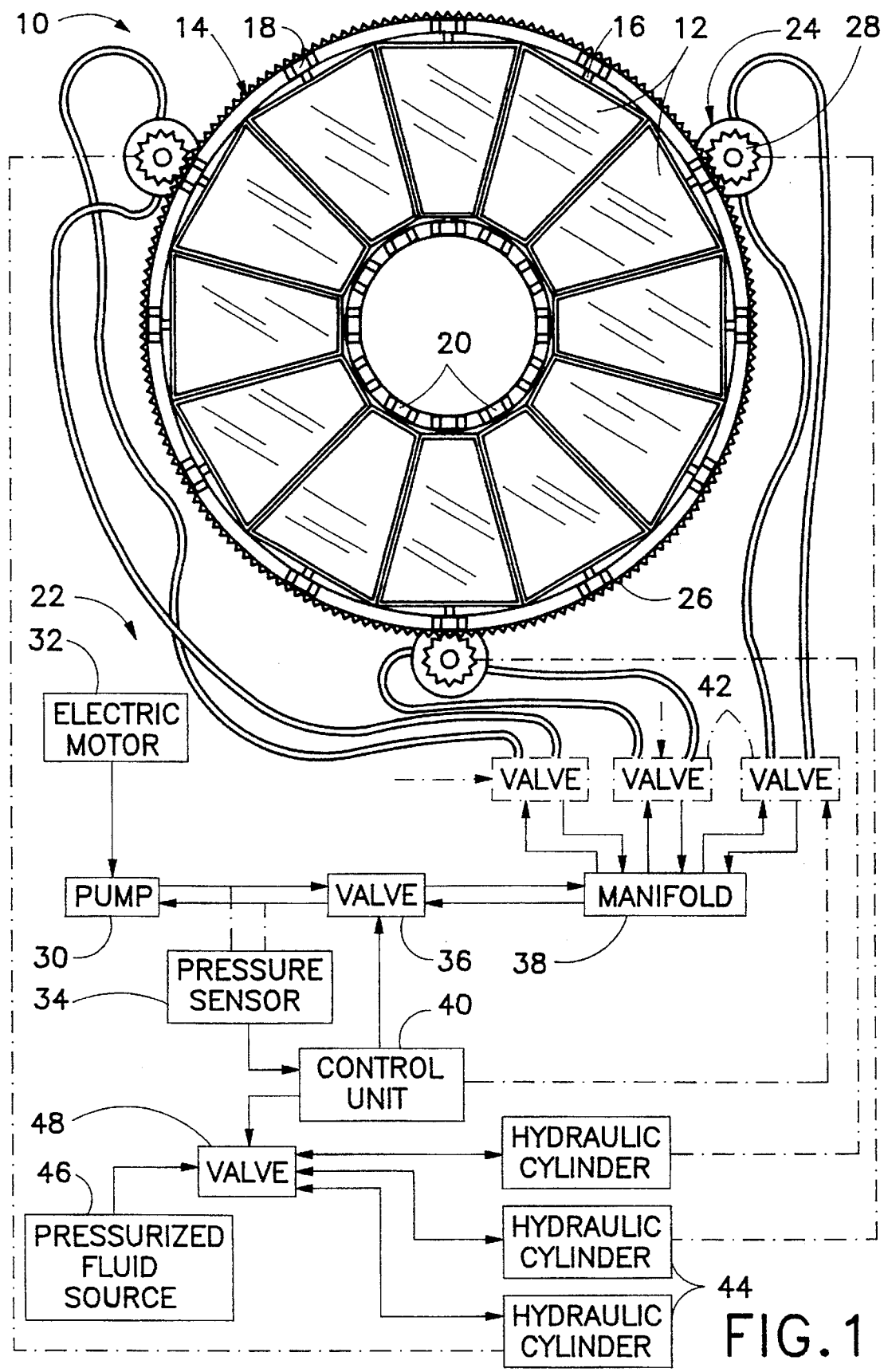
FIG. 1 is partially a block diagram and partially a schematic top plan view of a tilting pan filter assembly with a drive mechanism in accordance with the present invention. Piping for the transport of effluent, filtrate, etc., have been omitted for purposes of clarity.

As illustrated in FIG. 1, a tilting pan filter assembly 10 comprises a plurality of truncated pie-slice-shaped filter pans 12 disposed on a rotating annular carrier or turntable rack 14. Pans 12 are tiltably or pivotably supported on carrier 14 via respective radially oriented shafts 16 mounted to carrier 14 via respective pairs of bearings 18 and 20. Pans 12 are pivoted once (see FIG. 2) during each rotation of carrier 14 about a vertical axis, to dump particulate material which has been separated by the filtering process.

A drive mechanism 22 for filter assembly 10 includes, in addition to carrier 14, a plurality of individual drive devices in the form of hydraulic motors 24 operatively coupled to the carrier at respective drive points angularly equispaced from one another along a circular filter element transport path. Hydraulic motors 24 are direct-drive, high-torque motors which are readily available.

Drive mechanism 22 further comprises a ring or bull gear 26 rigid with carrier 14, while hydraulic motors 24 are provided with respective pinions 28 meshing with ring gear 26. Accordingly, carrier 14 and pans 12 are driven along a circular path by virtue of a direct drive via pinions 28. As shown in FIG. 1, ring gear 26 and hydraulic motors 24 are located outside filter carrier 14.

Each hydraulic motor 24 provides a high reaction load capacity, thereby assuming large tangential and radial separating forces created by the massive inertia of the rotating filter system. This configuration reduces the necessity for auxiliary centering wheels or casters and other supports normally used with a single point drive.

As further illustrated in FIG. 1, drive mechanism 22 further includes a single pump 30 operatively connected to the hydraulic motors 24 for supplying a hydraulic fluid under variable pressure and variable speed to the motors. The speed or flow rate of the working fluid (generally, oil) is varied by changing the displacement or stroke of the pump. The pressure varies to a maximum limit determined by the setting of a relief valve.

Hydraulic motors 24 are connected in parallel to one another to share load equally. More particularly, hydraulic motors 24 are connected in a closed loop hydraulic circuit to pump 30. This closed loop configuration provides acceleration and deceleration control governed by the rate of pump stroking.

Pump 30 is driven by a single fixed-speed electric motor 32. Electric motor 32 and pump 30 provide gradual acceleration and rapid shutdown in the event of mechanical interference of expensive machine elements. Dynamic braking is absorbed by electric motor 32.

Hydraulic motors 24 are hydro-mechanical transmissions that convert energy from electric motor 32 into a steplessly variable, bi-directional rotation energy. Pump 30 produces a moving, mechanically rigid column of oil which is converted by hydraulic motors 24 back into mechanical rotation and speed. The output torque of hydraulic motors 24 is a function of pressure applied to the moving column of oil as dictated by the driven load requirement. As load torque increases, the pump is required to produce its flow at increasing pressures, instantaneously and unforgivingly, within the constraints of pressure overload and relief settings.

The torque of the actual drive load is monitored via a pressure sensor 34 in communication with the column of oil pressurized by pump 30. In the event of failure of one hydraulic motor, the other motors 24 will provide adequate propulsion at reduced loads.

As further illustrated in FIG. 1, pump 30 is connected to hydraulic motors 24 via a valve 36 and a manifold 38. Valve 36 is actuated by a control unit 40 which may be a simple manual switch for determining the existence and direction of fluid flow in the hydraulic circuit. Alternatively, control unit 40 may be a preprogrammed microprocessor or logic circuit which monitors torque via pressure sensor 34 and determines the degree of energization of hydraulic motors 24. Control unit 40 may control all hydraulic motors 24 simultaneously via valve 36 or may vary individual motor energization selectively via optional supplementary valves 42. Upon detecting a change in pressure indicative of a failure of one or more hydraulic motors 24, control unit 40 actuates valve 36 and/or valves 42 to reverse the flow of working fluid and arrest the rotation of carrier 14.

The output of pressure sensor 34 may also be used by control unit 40 to monitor system wear. The instantaneous or actual torque or load as determined via pressure sensor 34 is compared with a reference or standard, namely, the torque or load measured when the machine is new. Control unit 40 may be provided with a manual input peripheral unit (not shown) to enable customization, e.g., the setting of a reference torque or load under installation or upon major repair operations.

Hydraulic motors 24 may be provided with hydraulic cylinders 44 or other force generating members (e.g., solenoids) for applying to pinions 28 a force which increases as torque increases to thereby hold the pinions in engagement with ring gear 26 as gear separation forces increase. More particularly, hydraulic cylinders 44 serve to pivot and hold hydraulic motor pinion gears 28 in engagement with ring gear 26.

As shown in FIG. 1, cylinders 44 may be actuated by a pressurized source of fluid 46 via a valve 48 responsive to control unit 40. Control unit 40 increases the amount of pressurizing fluid fed to cylinders 44, thereby increasing the extension of plunger members (not shown) thereof and the amount of force applied to hydraulic motor pinion gears 28.

Alternatively, hydraulic cylinders 44 may be energized by tapping off of the motor pressure. Thus, the forces applied to the pinions by hydraulic cylinders 44 will increase automatically and proportionately to torque increases, in direct opposition to gear separation forces.

Figure 2:
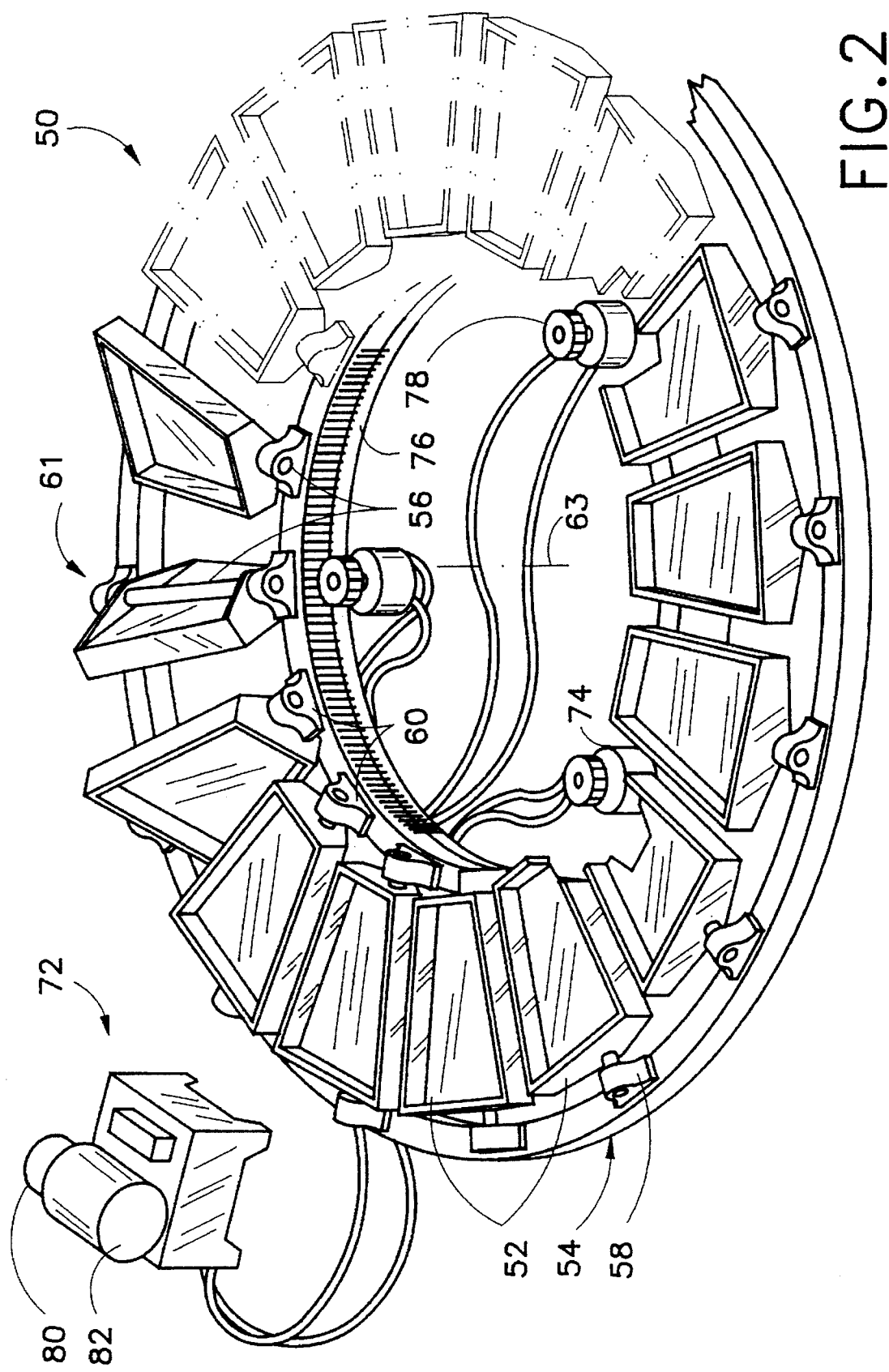
FIG. 2 is a schematic partial perspective view of a tilting pan filter assembly, showing another embodiment of a drive mechanism in accordance with the present invention.

As depicted in FIG. 2, a tilting pan filter assembly 50 with a modified drive mechanism 72 comprises truncated pie-slice-shaped filter pans 52 disposed on a rotating annular carrier or turntable rack 54. Pans 52 are tiltably or pivotably supported on carrier 54 via respective radially oriented shafts 56 mounted to carrier 54 via respective pairs of bearings 58 and 60. Pans 52 are pivoted once at a dumping station 61 during each rotation of carrier 54 about a vertical axis 63, to unload particulate material (not shown) which has been collected in pans 52 during a cycle of the filtering process.

Drive mechanism 72 includes a plurality of individual hydraulic motors 74 disposed at respective drive points angularly equispaced from one another along a circular transport path. Hydraulic motors 74 are direct-drive, high-torque motors drivingly connected to carrier 54.

Drive mechanism 72 further comprises a ring or bull gear 76 rigid with carrier 54. Pinions 78 on hydraulic motors 74 mesh with ring gear 76. As shown in FIG. 2, ring gear 76 and hydraulic motors 74 are located inside filter carrier 54.

As further illustrated in FIG. 2, drive mechanism 72 further includes a single pump 80 operatively connected to the hydraulic motors 74 for supplying a hydraulic fluid under variable pressure to the motors. The speed or flow rate of the working fluid can be varied by modifying the displacement or stroke of the pump. The pressure varies to a maximum limit determined by the setting of a relief valve.

As discussed above with respect to FIG. 1, hydraulic motors 74 are connected, in parallel to one another, in a closed loop hydraulic circuit. Pump 80 is driven by a single fixed-speed electric motor 82 which absorbs energy during braking. Electric motor 82 and pump 80 provide gradual acceleration and rapid shutdown.

The system of FIG. 2 has basically the same structure and functions in the same way as the system of FIG. 1. For example, hydraulic motors 74 convert energy from electric motor 82 into a steplessly variable, bi-directional rotation energy, while pump 80 produces a moving, mechanically rigid column of oil which is converted by hydraulic motors 74 back into mechanical rotation and speed. Torque may be monitored and operation of the hydraulic drive mechanism controlled as discussed above with reference to FIG. 1.

In operating the systems of FIGS. 1 and 2, electric motors 32 and 82 are energized to drive pumps 30 and 80, thereby pressurizing a working fluid. Hydraulic motors 24 and 74 are actuated by feeding the pressurized working fluid thereto. Hydraulic motors 24 and 74, being in operative engagement with respective filter element carriers 14 and 54, rotate the carriers about vertical axes (e.g., 63), along circular paths. Carriers 14 and 54 are moved by rotating pinions 28 and 78 of hydraulic motors 24 and 74. A force applied to pinions 28 and 78 increases as torque increases to hold the pinions in engagement with ring gears 26 and 76.

Where hydraulic motors 24 and 74 are operatively connected in parallel to one another and in series to pumps 30 and 80, respectively, operating the hydraulic motors 24 and 74 includes distributing the load substantially equally among the hydraulic motors. The equal distribution of the multi-point drives 24, 74 tends to self-cancel the reactive loads.

As in the operation of conventional tilting pan filter assemblies, pans 12 and 52 are automatically tilted in sequence at a predetermined unloading station (e.g., 61) along the filter element transport path.

A filter assembly drive mechanism as described hereinabove is provided with a relief valve (not shown) in the fluid flow path between the pump and the hydraulic motors. The relief valve automatically opens upon the attainment of a predetermined pressure by the working fluid. The hydraulic motors then slip or stall and hold without damage and overheating. Thus, neither a shear pin nor viscous couplings are required to protect against overload and damage to mechanical parts.

Although the invention has been described in terms of particular embodiments and applications, one of ordinary skill in the art, in light of this teaching, can generate additional embodiments and modifications without departing from the spirit of or exceeding the scope of the claimed invention. For example, the pinions and ring or bull gear may be replaced with an equivalent transmission assembly, for example, traction wheels in contact with a high friction annular drive surface on the filter carrier rack.

In addition, it is to be noted that the present invention is also applicable to rotating chemical filters other than tilting pan type filter assemblies.

Accordingly, it is to be understood that the drawings and descriptions herein are preferred by way of example to facilitate comprehension of the invention and should not be construed to limit the scope thereof.

What is claimed is:

1. In a filter assembly, a drive mechanism comprising:
a carrier supporting a filter element for motion along a predetermined path; and
a drive operatively coupled to said carrier for moving said carrier at a substantially uniform velocity along said path, said drive including a plurality of individual continuously operating hydraulic motors operatively coupled to said carrier at respective drive points spaced from one another along said path.

2. In a filter assembly, a drive mechanism comprising:
a carrier supporting a filter element for motion along a predetermined path; and
a drive operatively coupled to said carrier for moving said carrier along said path, said drive including a plurality of individual hydraulic motors operatively coupled to said carrier at respective drive points spaced from one another along said path, said carrier including a circular or annular rack, further comprising a ring gear rigid with said rack, said hydraulic motors being provided with pinions meshing with said ring gear.

3. The mechanism defined in claim 2 wherein said drive further includes a single pump operatively connected to said hydraulic motors for supplying a hydraulic fluid under variable pressure and variable flow rate to said hydraulic motors, said hydraulic motors being connected in parallel to share load equally.

4. The mechanism defined in claim 3 wherein said hydraulic motors are connected in a closed loop hydraulic circuit to said pump.

5. The mechanism defined in claim 3 wherein said drive further includes an electric motor drivingly connected to said pump.

6. The mechanism defined in claim 3 wherein said hydraulic motors are operable for applying to said pinions a force which increases as torque increases to hold said pinions in engagement with said ring gear.

7. The mechanism defined in claim 2 wherein said drive includes force-generating members which apply to said pinions a force which increases as torque increases to hold said pinions in engagement with said ring gear.

8. In a filter assembly, a drive mechanism comprising:
a carrier supporting a filter element for motion along a predetermined path; and
a drive operatively coupled to said carrier for moving said carrier along said path, said drive including a plurality of individual hydraulic motors operatively coupled to said carrier at respective drive points spaced from one another along said path, said hydraulic motors being connected in parallel to one another and in series with a common pump.

9. The mechanism defined in claim 8 wherein said pump is operative to supply a working fluid under variable pressure and variable flow rate to said hydraulic motors.

10. The mechanism defined in claim 8 wherein said hydraulic motors are connected in a closed loop hydraulic circuit to said pump.

11. The mechanism defined in claim 8 wherein said drive further includes an electric motor drivingly connected to said pump.

12. In a tilting pan filter assembly, a drive mechanism comprising:
carrier including a substantially annular rack for supporting a plurality of filter elements for motion along a predetermined circular path; and
a drive operatively coupled to said carrier for moving said rack with said filter elements along said path, said drive including a plurality of individual hydraulic motors operatively coupled to said rack at respective drive points spaced from one another along said path.

13. The mechanism defined in claim 12 wherein said drive further includes a single pump operatively connected to said hydraulic motors for supplying a hydraulic fluid under variable pressure and variable flow rate to said hydraulic motors, said hydraulic motors being connected in parallel to share load equally.

14. The mechanism defined in claim 13 wherein said hydraulic motors are connected in a closed loop hydraulic circuit to said pump.

15. The mechanism defined in claim 13 wherein said drive further includes an electric motor drivingly connected to said pump.

16. The mechanism defined in claim 12 wherein said hydraulic motors are operatively coupled to said rack via respective pinions and a ring gear fixed to said rack.

17. The mechanism defined in claim 16 wherein said hydraulic motors include force-generating members which apply to said pinions a force which increases as torque increases to hold said pinions in engagement with said ring gear.

18. The mechanism defined in claim 12 wherein said drive points are equispaced along said path.

19. The mechanism defined in claim 12, further comprising a mechanism for tilting said pans at a predetermined unloading station along said path.

20. A method for operating a filter assembly, comprising:
energizing an electric motor;
driving a pump by said electric motor upon energization thereof;
pressurizing a working fluid via said pump upon a driving thereof by said electric motor;
operating a plurality of hydraulic motors by feeding the pressurized working fluid thereto, said hydraulic motors being in operative engagement with a filter element carrier; and
moving said carrier along a predetermined path by virtue of operation of said hydraulic motors.

21. The method defined in claim 20 wherein the moving of said carrier along said path is implemented by rotating pinions of said hydraulic motors, said pinions meshing with a ring gear on said carrier.

22. The method defined in claim 21, further comprising applying to said pinions a force which increases as torque increases to hold said pinions in engagement with said ring gear.

23. The method defined in claim 20 wherein said hydraulic motors are operatively connected in parallel to one another and in series to said pump, the operating of said hydraulic motors including the step of distributing load substantially equally among said hydraulic motors.

24. The method defined in claim 20 wherein the filter assembly is a tilting pan filter assembly, a plurality of filter pans being disposed on said carrier, further comprising automatically tilting said pans at a predetermined unloading station along said path.

25. In a filter assembly, a drive mechanism comprising:

a carrier supporting a filter element for motion along a predetermined path; and a drive operatively coupled to said carrier for moving said carrier along said path, said drive including a plurality of individual hydraulic motors operatively coupled to said carrier at respective drive points equispaced from one another along said path.

26. A tilting pan filter assembly comprising:

a plurality of tiltable filter pans;

a carrier for supporting said filter pans for motion along a predetermined path;

a tilting mechanism engageable with said pans at a predetermined unloading station along said path for tilting said pans in seriatum at said unloading station; and a drive operatively coupled to said carrier for moving said carrier along said path, said drive including a plurality of individual hydraulic motors operatively coupled to said carrier at respective drive points spaced from one another along said path.

* * * * *